United States Patent
Huang et al.

(10) Patent No.: US 9,129,395 B2
(45) Date of Patent: Sep. 8, 2015

(54) GRAPHIC RENDERING ENGINE AND METHOD FOR IMPLEMENTING GRAPHIC RENDERING ENGINE

(71) Applicant: TENCENT TECHNOLOGY (SHENZHEN) COMPANY LIMITED, Shenzhen, Guangdong (CN)

(72) Inventors: Yuan Huang, Shenzhen (CN); Feiyue Huang, Shenzhen (CN); Yongjian Wu, Shenzhen (CN); Liqian Dong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 13 days.

(21) Appl. No.: 14/144,348

(22) Filed: Dec. 30, 2013

(65) Prior Publication Data
US 2014/0111527 A1    Apr. 24, 2014

Related U.S. Application Data

(63) Continuation of application No. PCT/CN2012/076507, filed on Jun. 6, 2012.

(30) Foreign Application Priority Data

Jul. 7, 2011    (CN) .......................... 2011 1 0189638

(51) Int. Cl.
*G06F 13/14*    (2006.01)
*G06F 15/00*    (2006.01)
*G06T 1/00*    (2006.01)
(Continued)

(52) U.S. Cl.
CPC . *G06T 1/20* (2013.01); *G09G 5/006* (2013.01)

(58) Field of Classification Search
None
See application file for complete search history.

(56) References Cited

U.S. PATENT DOCUMENTS

| 5,491,813 A * | 2/1996 | Bondy et al. ................... 719/323 |
| 6,289,396 B1 * | 9/2001 | Keller et al. ................... 719/323 |

(Continued)

FOREIGN PATENT DOCUMENTS

| CN | 101118645 A | 2/2008 |
| CN | 101937358 A | 1/2011 |

(Continued)

OTHER PUBLICATIONS

International Search Report for International Patent Application No. PCT/CN2012/076507, dated Aug. 23, 2012, and English translation thereof.

(Continued)

*Primary Examiner* — Jacinta M Crawford
(74) *Attorney, Agent, or Firm* — Harness, Dickey & Pierce, P.L.C.

(57) ABSTRACT

A method for implementing a graphic rendering engine may be provided. In the method, rendering function information of a first graphic processing interface and a second graphic processing interface may be extracted. The first graphic processing interface and the second graphic processing interface may be encapsulated as a graphic rendering engine interface. Member functions of the graphic rendering engine interface may be defined according to the rendering function information. A rendering function corresponding to the member functions may be implemented by calling the first graphic processing interface or the second graphic processing interface with the graphic rendering engine interface.

9 Claims, 7 Drawing Sheets

(51) Int. Cl.
*G06T 1/20* (2006.01)
*G09G 5/00* (2006.01)

(56) References Cited

U.S. PATENT DOCUMENTS

| | | | |
|---|---|---|---|
| 7,844,442 | B2 | 11/2010 | Tzruya |
| 8,214,849 | B2 * | 7/2012 | Cooper .................. 719/323 |
| 2005/0264589 | A1 | 12/2005 | Kimoto et al. |
| 2006/0048062 | A1 | 3/2006 | Adamson |
| 2008/0030510 | A1 | 2/2008 | Wan et al. |
| 2010/0328323 | A1 | 12/2010 | Redman et al. |
| 2014/0143711 | A1 | 5/2014 | Fry et al. |

FOREIGN PATENT DOCUMENTS

| | | |
|---|---|---|
| JP | 2005339443 A | 12/2005 |
| JP | 2006073001 A | 3/2006 |
| WO | 2010151385 A1 | 12/2010 |

OTHER PUBLICATIONS

Japanese Office Action for Application No. 2014-517410 dated Dec. 25, 2014, and its English translation thereof.

Dazeley, Richard. "3D APIs in Interactive Real-Time Systems: Comparison of OpenGL, Direct3D and Java3D"; Oct. 2000.

* cited by examiner

GRAPHIC RENDERING ENGINE AND METHOD FOR IMPLEMENTING GRAPHIC RENDERING ENGINE

CROSS-REFERENCE TO RELATED APPLICATIONS

This application is a continuation of International Patent Application No. PCT/CN2012/076507 filed on Jun. 6, 2012. This application claims the benefit and priority of Chinese Patent Application No. 201110189638.0, filed Jul. 7, 2011. The entire disclosures of each of the above applications are incorporated herein by reference.

FIELD

The present disclosure relates to graphic processing technologies and to a graphic rendering engine and a method for implementing the graphic rendering engine.

BACKGROUND

This section provides background information related to the present disclosure which is not necessarily prior art.

At present, in a Windows Operating System (OS), most applications with graphic interfaces are rendered with a specific graphic rendering engine.

The present graphic rendering engine mainly renders the graphic interfaces adopting a graphic processing interface. The present graphic processing interface mainly includes: a Graphics Device Interface (GUI) and improved versions thereof, such as GDI+ (GDI Plus), Direct3D (D3D) and an Open Graphics Library (OpenGL).

Except for games, most applications render the graphic interfaces for the applications with Microsoft's GDI and an improved version GDI+ of the GDI. The principle of the GDI is operating and copying pixels in a memory. A user may execute operations, such as graphics and files outputting on a screen, a printer or other output device with many functions provided by the GDI or the GDI+. The GDI and the GDI+ may output the output of the applications on the hardware device and a programmer need not to be concerned with the processing of the hardware devices and device drivers, which is convenient for development. The GDI and the GDI+ have good compatibility on the Windows platform.

Although the GDI and GDI+ have good compatibility, the rendering efficiency of the GDI and the GDI+ is low. The GDI and GDI+ are used in simple graphic applications, in which the efficiency of the GDI and GDI+ is acceptable. However, in some complicated graphic application scenarios, such as games and professional graphics making and viewing applications, the efficiency of the GDI and GDI+ is apparently low. The following operations are pixels-based operations. The efficiency of the GDI and the GDI+ is specifically low when performing the following operations.

Alpha blending (i.e. a graphic is rendered on another graphic in a translucent mode), high quality graphic zooming, and arbitrary rotation of a graphic.

Although the GDI+ partially uses hardware acceleration, the actual rendering efficiency is lower than that of the GDI.

Another drawback of the GDI and GDI+ is occupying too many resources. Although there is a Graphic Processing Unit (GPU), which is independent of the CPU, specially made for graphic rendering and has powerful parallel computing capabilities, in the conventional method for performing the acceleration, the GDI and GDI+ do not extensively use the GPU to achieve the purpose of acceleration, but relies more on the CPU.

Another graphic processing interface is the D3D, which is a 3D graphic interface provided by the Microsoft and is widely used in advanced graphic applications, such as games. The rendering efficiency of the D3D is high and the D3D performs the hardware acceleration with the dedicated GPU.

Another graphic processing interface is an Open Graphics Library (OpenGL), which defines a standard for a cross-language and cross-platform programming interface and is used for rendering a three-dimensional graphic (or a two-dimensional graphic). The OpenGL is a professional graphic programming interface is a powerful underlying graphic library.

However, the D3D and OpenGL have the following two drawbacks, which limit the application of the D3D and the OpenGL.

First, more hardware tiers are involved and capability is poor. In the graphic rendering process, errors may occur due to influence of a hardware environment.

Second, the interface is complicated. A lot of codes need to be written for each rendering processing, which burdens the development.

Users' demand on the graphic processing grows rapidly. The users not only demand a gorgeous and smooth interface, but also demand faster, more efficient and better quality of performance.

However, the graphic processing interfaces, i.e., the GDI, GDI+, D3D and OpenGL, in the conventional method have their drawbacks. It is hard for them to satisfy comprehensive performance requirements of the application interface rendering. The comprehensive performances include high rendering efficiency, less CPU occupation, good capability and easy-to-use interfaces.

SUMMARY

This section provides a general summary of the disclosure, and is not a comprehensive disclosure of its full scope or all of its features.

Various embodiments provide a graphic rendering engine and a method for implementing the graphic rendering engine to implement relatively high graphic rendering comprehensive performances and satisfy requirements for rendering applications.

In order to solve the above problem, various embodiments provide a method for implementing a graphic rendering engine, including:

extracting rendering function information of a first graphic processing interface and a second graphic processing interface;

encapsulating the first graphic processing interface and the second graphic processing interface as a graphic rendering engine interface;

defining member functions of the graphic rendering engine interface according to the rendering function information; and implementing a rendering function corresponding to the member functions by calling the first graphic processing interface or the second graphic processing interface with the graphic rendering engine interface.

Accordingly, another embodiment provides a graphic rendering engine, including:

an information extraction module, to extract rendering function information of a first graphic processing interface and a second graphic processing interface;

an interface encapsulation module, encapsulate the first graphic processing interface and the second graphic processing interface as a graphic rendering engine interface;

a function defining module, to define member functions of the graphic rendering engine interface according to the rendering function information extracted by the information extraction module; and a rendering processing module, to implement a rendering function corresponding to the member functions by calling the first graphic processing interface or the second graphic processing interface with the graphic rendering engine interface.

The technical scheme of the present disclosure may have the following technical effects.

Compared with the conventional method, since the first graphic processing interface and the second graphic processing interface may be two different graphic processing interfaces, in various embodiments, the two different graphic processing interfaces with different advantages may be encapsulated together to form a graphic rendering engine interface. In the process for rendering an interface of an application, the graphic rendering engine interface may automatically select a graphic processing interface according to the system environment to implement the corresponding rendering function. Therefore, advantages of each graphic processing interface may be combined together to enhance the comprehensive performances of the graphic rendering.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
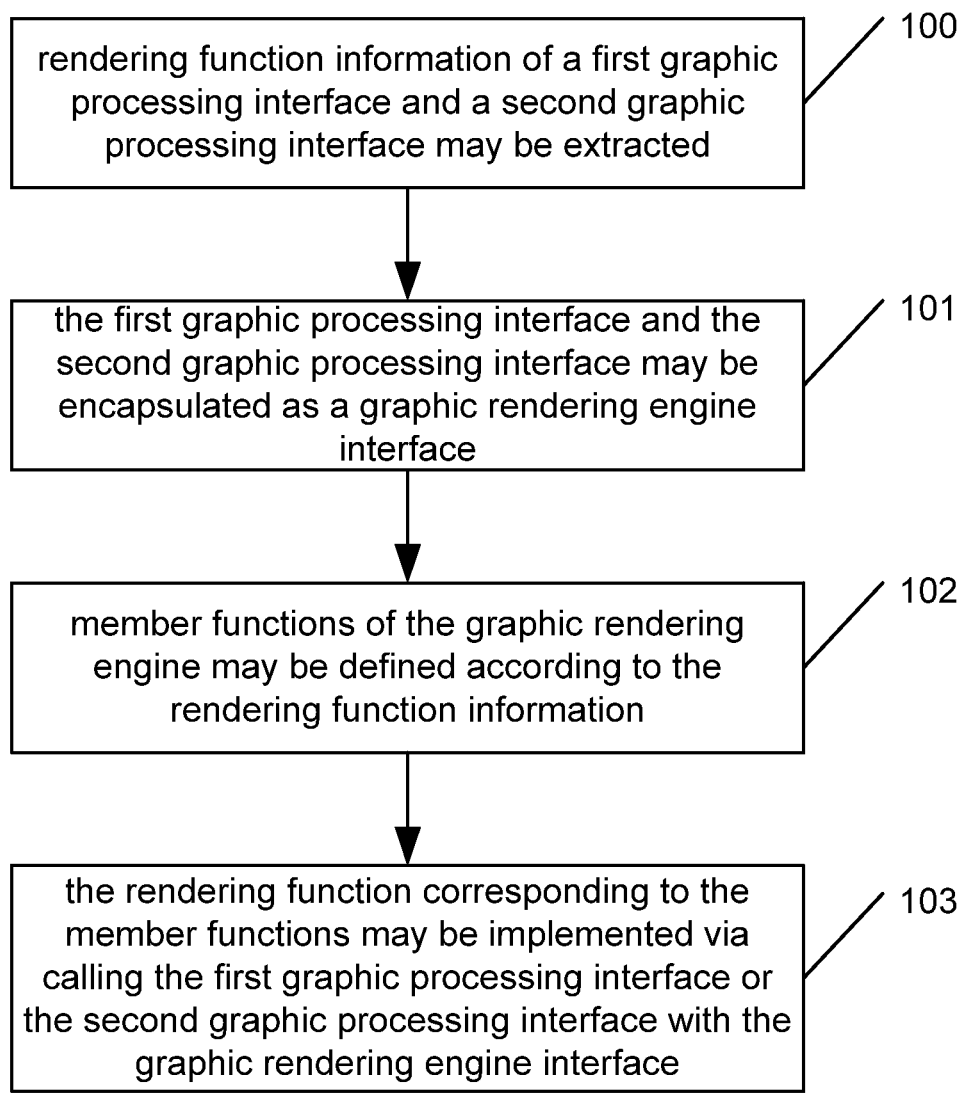
FIG. 1 is a flow chart illustrating a method for implementing a graphic rendering engine in accordance with various embodiments.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

For simplicity and illustrative purposes, the present disclosure is described by referring to various embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

A rendering engine may be located at the bottom of a software system and may provide rendering services, such as interface rendering, for the software.

A GDI may be a graphic processing interface provided by the Microsoft and used for rendering graphics on a graphic device (such as a display).

The GDI+ may complement the GDI and may be an updated version of the GDI. On the basis of the GDI, some functions may be optimized and new functions may be added. In the following description of various embodiments, the GDI and GDI+ are called the GDI.

The D3D may be another graphic processing interface provided by the Microsoft, is a 3D graphic interface, may be partial of DirectX products and may be used for implementing rapid rendering on the basis of hardware acceleration.

The OpenGL may be another graphic processing interface, which may define a standard for a cross-language and cross-platform programming interface and may be used for rendering a three-dimensional graphic (or a two-dimensional graphic). The OpenGL may be a professional graphic programming interface and may be a powerful underlying graphic library.

The CPU may be responsible for computing of the computer.

The GPU may be a concept corresponding to that of the CPU, may be independent of CPU, may be dedicated to perform computing in the graphic rendering and may have powerful parallel computing power.

In order to obtain a technical scheme with high rendering efficiency, less CPU occupation, good capability and easy-to-use interfaces, a graphic rendering engine and a method for implementing the graphic rendering engine provided by various embodiments may be as follows.

A graphic rendering engine interface may be generated. The graphic rendering engine interface may be generated by encapsulating the D3D interface and GDI or encapsulating the OpenGL interface and the GDI. After the graphic rendering engine interface is generated, a scheme with the D3D rendering function and a scheme with the GDI rendering function may be provided. In the alternative, a scheme with the OpenGL rendering function and a scheme with the GDI rendering function may be provided. Therefore, the graphic rendering engine provided by various embodiments may be considered as a dual-core graphic rendering engine. In practice, on a same computer and at some point, the graphic rendering engine is in one rendering mode, i.e., a D3D rendering mode, a GDI rendering mode or an OpenGL rendering mode. Since in the graphic rendering engine in various embodiments, the D3D interface and the GDI may be encapsulated together or the OpenGL interface and the GDI may be encapsulated together, the compatibility may be good and the interface may be easy to use. In addition, at different moments, one of the D3D interface, GDI and OpenGL interface may be called to render the graphics. Therefore, less CPU resources may be occupied and the rendering efficiency is high. The comprehensive performances of the graphic rendering may be enhanced. The comprehensive performances may include high rendering efficiency, less CPU occupation, good compatibility and easy-to-use interfaces.

The graphic rendering engine and a method for implementing the graphic rendering engine in various embodiments may be described hereinafter with reference to accompanying figures.

Referring to FIG. 1, FIG. 1 is a flow chart illustrating a method for implementing a graphic rendering engine in accordance with various embodiments.

The method provided includes the following blocks.

In block 100, rendering function information of a first graphic processing interface and a second graphic processing interface may be extracted.

In block 101, the first graphic processing interface and the second graphic processing interface may be encapsulated as a graphic rendering engine interface.

The graphic rendering engine may be an external interface. Two graphic processing interfaces may be encapsulated into (i.e., provided by) the graphic rendering engine interface. For instance, the first graphic processing interface may be the D3D interface or the OpenGL interface. The second graphic processing interface may be the GDI. The rendering effects of the two graphic processing interfaces may be the same. The rendering efficiency, CPU occupation, compatibility and interface usability may be different.

The expression form of the graphic rendering engine interface in the code level may be similar to that of the GDI. Since the compatibility of the GDI may be high and may be easy to use, the graphic rendering engine interface may have good compability and usability.

In block 102, member functions of the graphic rendering engine may be defined according to the rendering function information.

The member functions may be used for implementing the graphic rendering function. The member functions may be implemented in two modes. One of the implementation modes may be the member functions of the first graphic processing interface and the other implementation mode may be the member functions of the second processing interface. As for the same member function, no matter which graphic processing interface the member function belongs to, the rendering effect of the member functions may be the same.

In block 103, the rendering function corresponding to the member functions may be implemented via calling the first graphic processing interface or the second graphic processing interface with the graphic rendering engine interface. The graphic rendering engine may automatically select a graphic processing interface via the graphic rendering engine interface according to the current system environment to implement the corresponding rendering function.

In practice, the rendering functions of the first graphic processing interface and the second graphic processing interface may be classified into following four categories.

The first category may include functions, such as initializing the rendering engine, controlling the rendering flow and managing a device status.

The second category may include functions, such as rendering various shapes, characters and graphics, selecting the resources and controlling a coordinate and a viewing angle.

The third category may be a computing and expression function of the coordinate.

The fourth category may include functions, such as creating and showing various rendering resources, such as a brush, a pen, a font and an image.

In order to encapsulate the first graphic processing interface and the second graphic processing interface, common rendering function information of them may need to be extracted. The rendering function information of the above four categories may be extracted. The rendering function information of the first graphic processing interface and the second graphic processing interface may include but not be limited to the above four categories. The above four categories are examples for description.

After the rendering function information may be extracted, the first graphic processing interface and the second graphic processing interface may be encapsulated into the graphic rendering engine interface. The member functions of the graphic rendering engine interface may be defined according to the extracted rendering function information.

Figure 2:
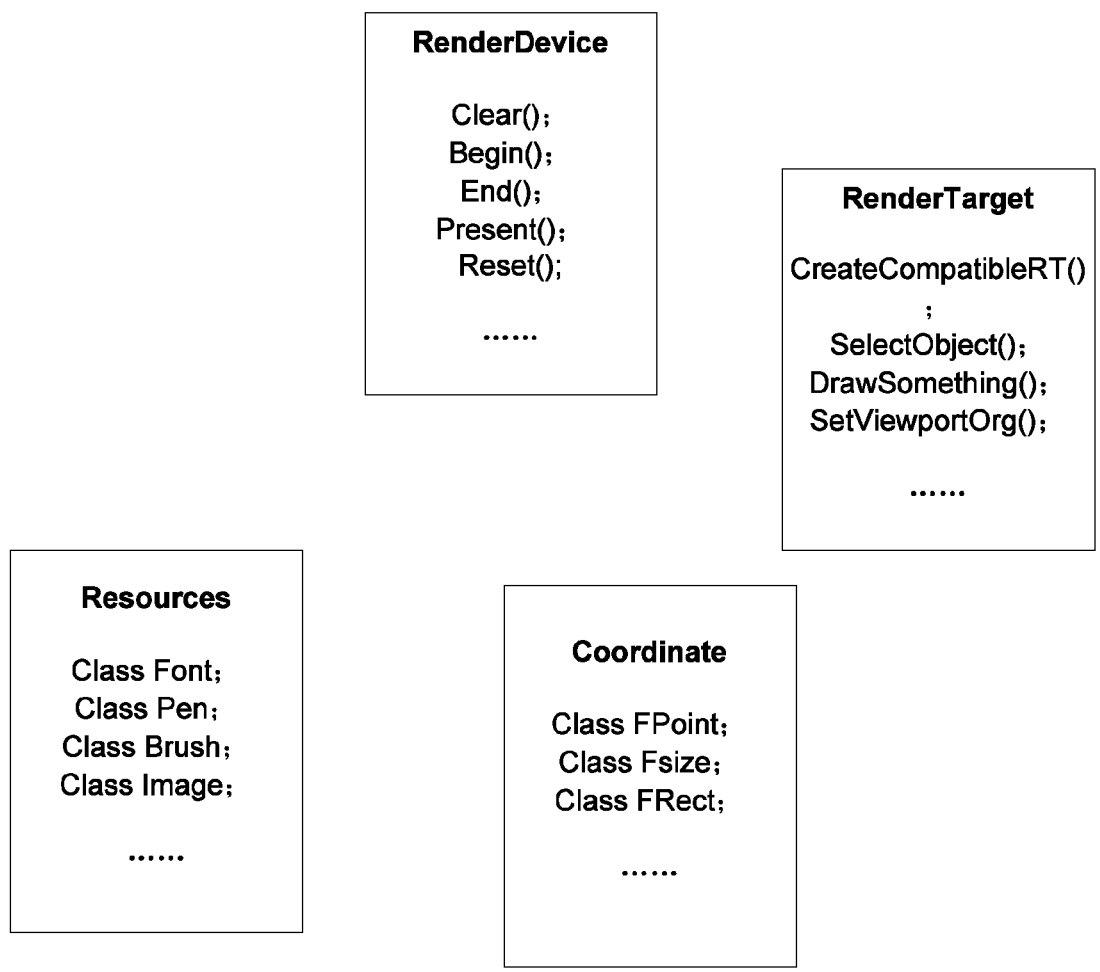
FIG. 2 is a schematic diagram illustrating member functions of a graphic rendering engine interface in accordance with various embodiments.

Referring to FIG. 2, in practice, the member functions of the graphic rendering engine interface may include: a RenderDevice function, a RenderTarget function, a Size and Coordinate function and a Resources function.

The RenderDevice function may be expressed as a class Render Device. The class Render Device may be used for implementing the rendering functions in the above first category.

The RenderTarget function may be expressed as a class Render Target. The class Render Target may be used for implementing the rendering functions in the above second category.

The Size and Coordinate function may be expressed as:
class FSize;
class FPoint; and
class FRect.

The Size and Coordinate function may be used as parameters of various rendering functions and may be used for implementing the rendering functions in the above third category.

The Resources function may be expressed as:
class Pen;
class Brush;
class Font; and
class Image.

The Resources function may be used for implementing the rendering functions of the rendering resources in the above fourth category. The above rendering resources are listed for example and there may be other rendering resources, which are not listed here.

The first graphic processing interface provided by various embodiments is the D3D interface or the OpenGL interface. The second graphic processing interface is the GDI.

Taking that the D3D interface and the GDI are encapsulated in the graphic rendering engine for example, when the graphic is rendered with the graphic rendering engine provided by various embodiments, a section of simple rendering codes are as follows.

```
RenderDevice dev;
  dev.InitAsD3DRenderDevice( );   // after this block, the RenderDevice
may not be in the D3D mode and may be statically transformed to the
GDI mode.
    dev.InitAsD3DRenderDevice( );//
    RenderTarget* pRT = dev.GetRenderTarget( );
    Image* pImage = new Image("TestImage.bmp");   // resource creation
    Brush* pRedBrush = new Brush(RGB(255, 0, 0));
    pRT->SelectBrush(*pRedBrush); // resource selection
    dev.BeginScene( );                      // rendering flow - start
    pRT->DrawImage(pImage, 100, 100);       // graphic rendering
    pRT->FillRect(Rect(0,0,40,40));         // render a red rectangle
    dev.EndScene( );                        // rendering flow - end
    dev.Present( );
    delete pImage;
    delete pRedBrush;
```

Figure 3:
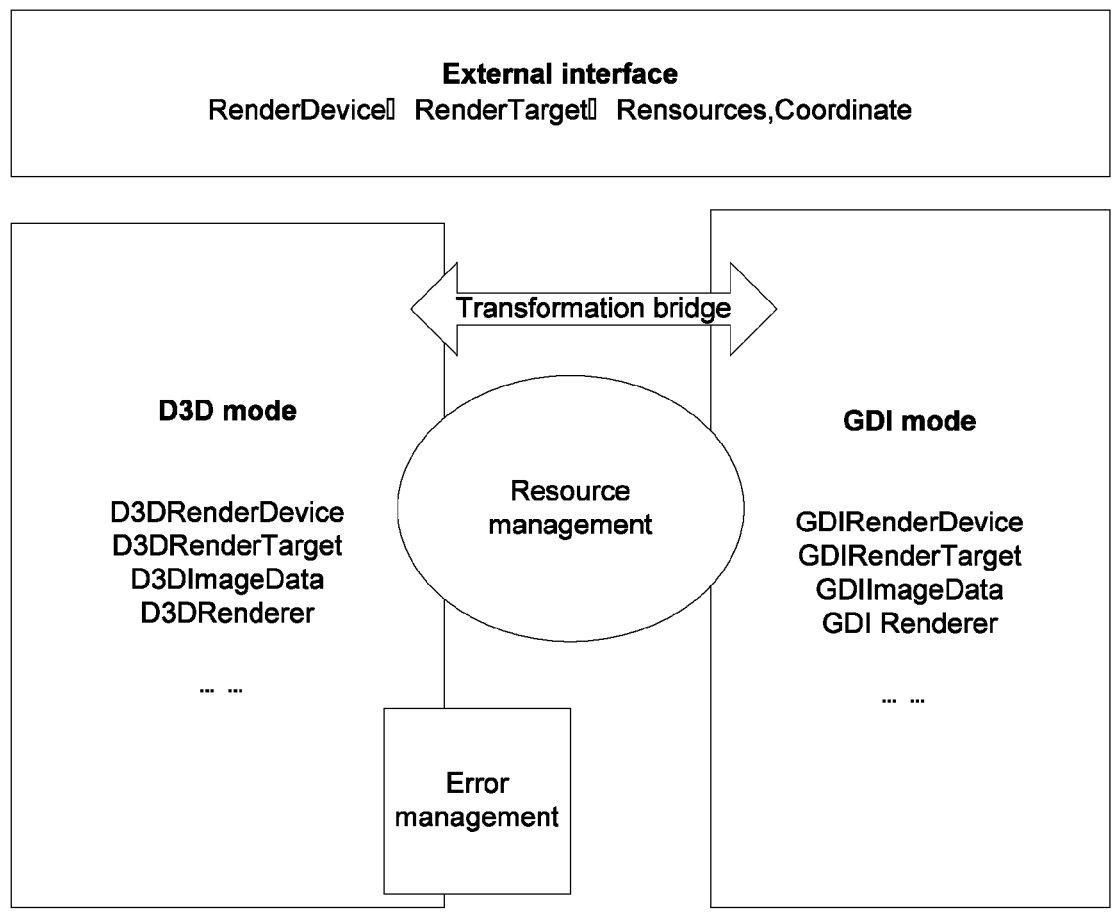
FIG. 3 is a diagram illustrating a method for implementing a graphic rendering engine in accordance with various embodiments.

Referring to FIG. 3, FIG. 3 is a diagram illustrating a method for implementing a graphic rendering engine in accordance with various embodiments.

The external interface provided by the graphic rendering engine may be the graphic rendering engine interface. There may be two graphic processing interfaces with different advantages in the graphic rendering engine interface. The rendering effects of the two graphic processing interfaces may be the same. Therefore, the graphic rendering engine in this embodiment may render graphics with a better graphic processing interface selected according to the system environment to enhance the comprehensive performances of the graphic rendering engine.

In various embodiments, the graphic rendering engine interface may provide D3D and GDI modes for implementing the graphic rendering function, i.e., the D3D interface and the GDI, for rendering functions, such as the RenderDevice function, RenderTarget function, a Size and Coordinate function (Size, Point and Rect) and a Resources function (Brush, Pen, Font and Image). That is, two graphic processing interfaces, i.e. the D3D interface and GDI may be provided. Each graphic processing interface may have the rendering functions. The same rendering function in the two graphic processing interfaces may achieve the same rendering effect. Different graphic processing interfaces may have different rendering efficiencies, CPU occupations, compatibility and interface utilities. The D3D mode may be statically and dynamically transformed to the GDI mode. A transformation bridge, resource management module and error processing module in FIG. 3 may serve for the dynamic transformation from the D3D mode to the GUI mode.

If the OpenGL interface and the GDI are encapsulated in the graphic rendering engine interface, the OpenGL and GDI modes for implementing the graphic rendering function may be provided. That is, the OpenGL interface and the GDI may be provided. Each graphic processing interface may have the rendering functions and the same rendering function in the two graphic processing interfaces may have the same rendering effect. The rendering efficiencies, CPU occupations, compatibility and interface utilities of the same rendering function in different graphic processing interfaces may be different.

In various embodiments, the D3D interface (first graphic processing interface) and the GDI (the second graphic processing interface) may be encapsulated into the graphic rendering engine interface. The process for implementing the rendering function of the member functions via calling the first graphic processing interface and the second graphic processing interface with the graphic rendering engine interface may be described hereinafter.

Figure 4:
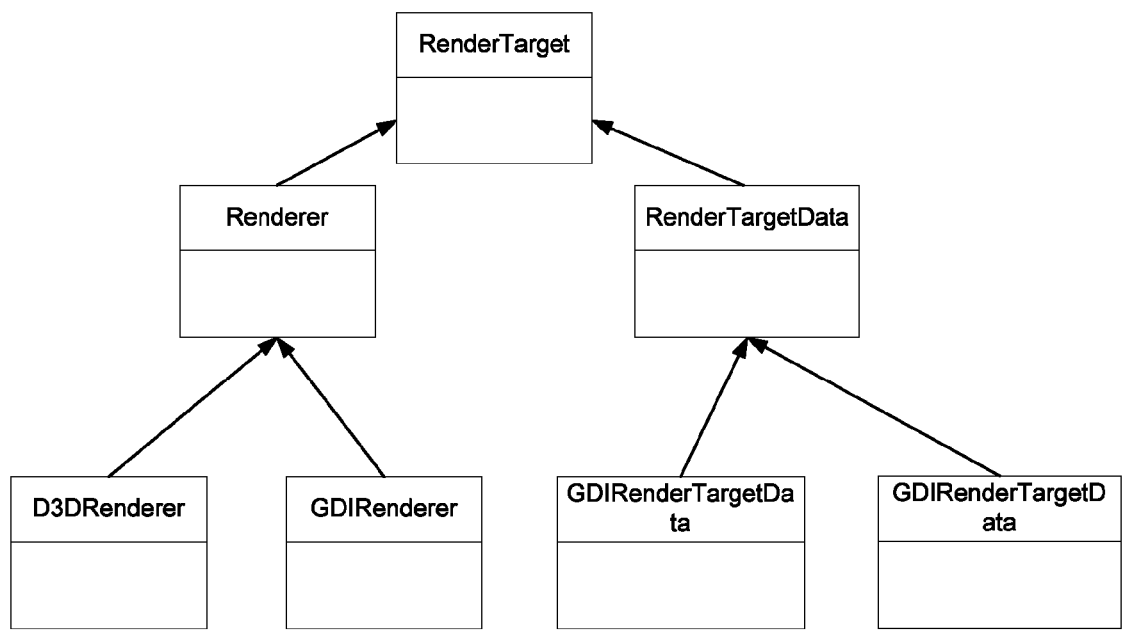
FIG. 4 is a schematic diagram illustrating a RenderTarget function in a graphic rendering engine interface in accordance with various embodiments.

In the member functions, taking the RenderTarget function for example, when the graphic rendering engine interface implements the rendering function using the RenderTarget function, the RenderTarget function may be used for rendering graphics in RenderTargetData using a Renderer. In the D3D mode (i.e., the graphic rendering engine interface may implement the rendering function via calling the D3D interface), the graphic rendering engine interface may render graphics in D3DRenderTargetData using a D3DRenderer. In the GDI mode (i.e. the graphic rendering engine interface may implement the rendering function via calling the GDI), the graphic rendering engine interface may render graphics in GDIRenderTargetData using a GDIRenderer. A process that the D3D mode may be transformed to the GDI mode is a process, in which the RenderTargetData and the Renderer may be changed. The structure of the RenderTarget in the graphic rendering engine interface may be shown in FIG. 4. The RenderTarget function may include a Renderer and RenderTargetData. The Renderer may include a D3DRenderer and a GDIRenderer. The RenderTargetData may include D3DRenderTargetData and GDIRenderTargetData. The D3DRenderer may use the D3D rendering method and the GDIRenderer may use the GDI rendering method. D3DUSAGE_RENDERTARGET texture of the D3D may be encapsulated in the D3DRenderTargetData. DC and HBITMAP in a GDI may be encapsulated in the GDI RenderTargetData.

Codes of the RenderTarget function are as follows:

```
class RenderTarget
{
private:
    Renderer*m_pRenderer;
    RenderTargetData* m_pRenderTargetData;
};
```

Renderer and RenderTargetData are declared above.

The process for implementing the rendering function corresponding to the RenderTarget function by calling the D3D interface or the GDI with the graphic rendering engine interface may be described hereinafter.

a) When the graphic rendering engine starts, i.e., is initialized, the RenderTarter function may be implemented by default using the D3D interface. Initialization codes are as follows.

```
    m_pRenderer = new D3DRenderer; //The Renderer may be
initialized as D3DRenderer.
    m_pRenderTargetData  =  new D3DRenderTargetData  //  The
RenderTargetData may be initialized as D3DRenderTargetData.
``` b) When fatal rendering errors (such as, when a video memory is insufficient) occur in the process for running the graphic rendering engine, a transformation operation may be needed to continue to render the graphic using the GDI to prevent the collapse of the software. This situation may be the dynamic transformation processing described in various embodiments. When the D3D mode is transformed to the GDI mode, the following processing may be needed.

```
Renderer* pNewRenderer = new GDIRenderer;
// Contents (D3D) in m_pRenderer may be transformed to the GDI in
the pNewRenderer via a transformation bridge to implement the
transformation from the D3DRender to the GDIRender.
    SAFE_DELETE(m_pRenderer);
    m_pRenderer = pNewRenderer;
// The Processing for transforming the mode of the RenderTargetData
from the D3D mode to the GDI mode may be similar to that of the
Renderer, which may not be repeated here.
```

Figure 5:
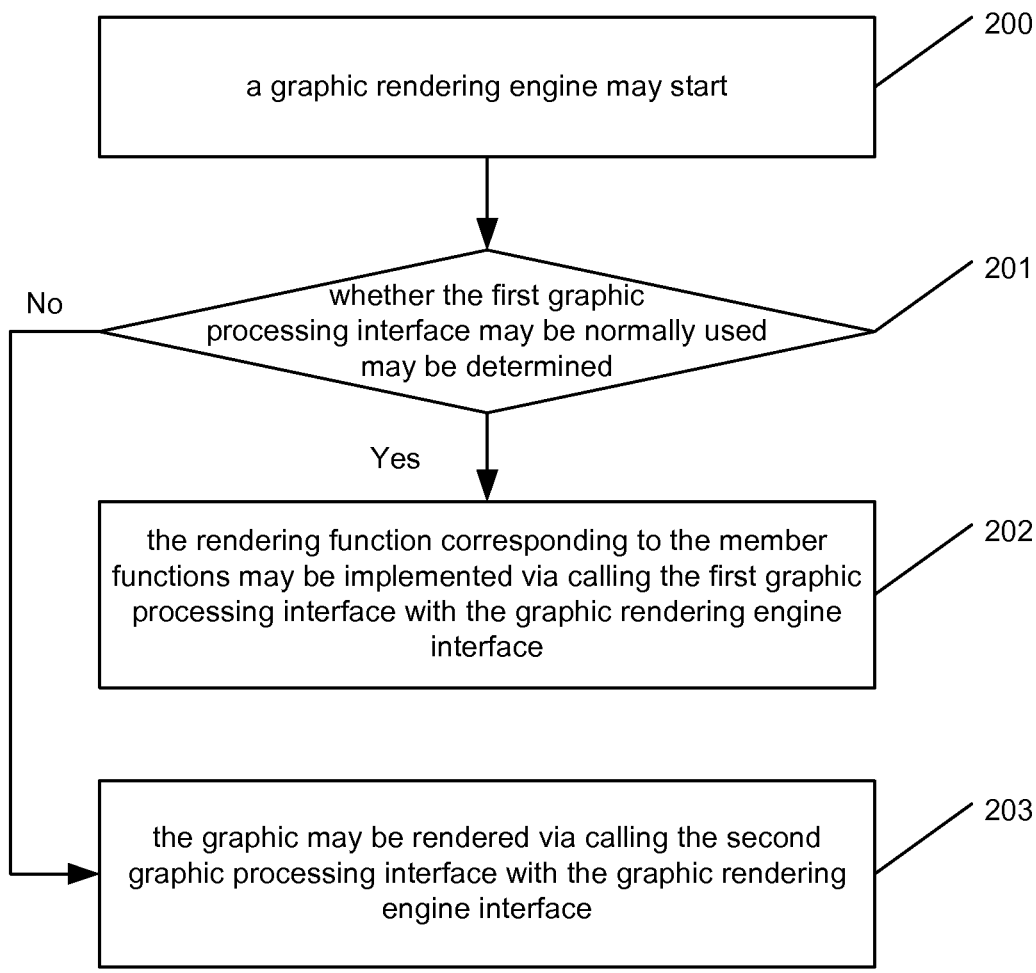
FIG. 5 is a flow chart illustrating a method for implementing static transformation with a graphic rendering engine in accordance with various embodiments.

Referring to FIG. 5, FIG. 5 is a flow chart illustrating a method for implementing static transformation with a graphic rendering engine in accordance with various embodiments.

The processing for implementing the rendering function corresponding to the member functions via calling the first graphic processing interface or the second graphic processing interface with the graphic rendering engine interface may be described in the following embodiment. The method may include the following blocks.

In block 200, a graphic rendering engine may start.

In block 201, whether the first graphic processing interface may be normally used may be determined. The method for determining whether the first graphic processing interface may be normally used may include: checking whether the current OS may support the first graphic processing interface, determining that the first graphic processing interface may be normally used if the current OS may support the first graphic processing interface; otherwise, determining that the first graphic processing interface may not be normally used. The method may further include determining whether an error occurs in the process for initializing the first graphic processing interface when determining that the current OS may support the first graphic processing interface, determining that the first graphic processing interface may not be normally used if an error occurs; otherwise, determining that the first graphic processing interface may be normally used.

In block 202, if the first graphic processing interface may be normally used, the rendering function corresponding to the member functions may be implemented via calling the first graphic processing interface with the graphic rendering engine interface.

In block 203, if the first graphic processing interface may not be normally used, the graphic may be rendered via calling the second graphic processing interface with the graphic rendering engine interface.

As described above, whether the first graphic processing interface may be normally used may be determined when the graphic rendering engine starts. When the first graphic processing interface may not be normally used, the graphic may be rendered via calling the second graphic processing interface. The above processing may refer to the static transformation between different graphic processing interfaces. The static transformation process may be described hereinafter taking that the D3D interface and the GDI are encapsulated in the graphic rendering engine for an example.

The static transformation may refer to that when a user instructs to initialize (i.e., InitAsD3DRenderDevice mentioned in the above "codes") the graphic rendering engine in the D3D mode, it may be detected that the current OS cannot support the D3D mode, or an error occurs in a step that the D3D is initialized, the current process may be transformed to a process, in which the graphic rendering engine may be initialized in the GDI mode. Since the transformation process may be performed when a program is initialized, the graphic rendering engine may not create any resource then. Therefore, the static transformation process may be simple.

Figure 6:
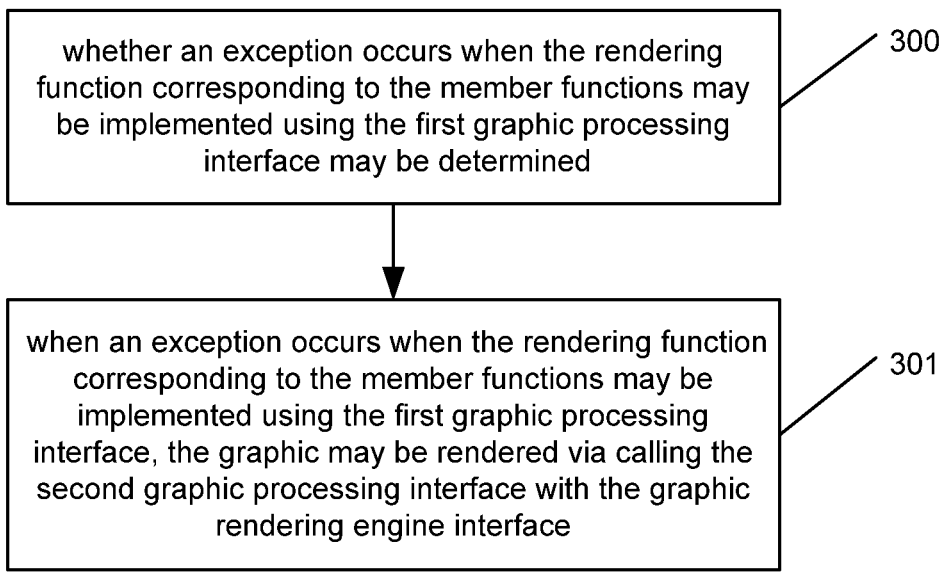
FIG. 6 is a flow chart illustrating a method for implementing dynamic transformation with a graphic rendering engine in accordance with various embodiments.

Referring to FIG. 6, FIG. 6 is a flow chart illustrating a method for implementing dynamic transformation with a graphic rendering engine in accordance with various embodiments.

The process for implementing the rendering function corresponding to the member functions via calling the first graphic processing interface or the second graphic processing interface with the graphic rendering engine interface may be described hereinafter in detail. The dynamic transformation may refer to that the graphic rendering engine has been successfully initialized as the first graphic processing interface, a fatal rendering error (such as a video memory is insufficient) occurs in the process for running the graphic rendering engine, a transformation operation may be needed to continue to render the graphic using the second graphic processing interface to prevent the collapse of the software.

In the dynamic transformation scenario, the above blocks 200 to 202 may need to be performed first. That is, when the first graphic processing interface may be normally used, the rendering function corresponding to the member functions may be implemented first via calling the first graphic processing interface with the graphic rendering engine interface. Then, following blocks 300 to 301 may be executed. That is, when it is detected that the first graphic processing interface is abnormal, the second graphic processing interface may be called to render the graphic.

In block 300, whether an exception occurs when the rendering function corresponding to the member functions may be implemented using the first graphic processing interface may be determined.

In block 301, when an exception occurs when the rendering function corresponding to the member functions may be implemented using the first graphic processing interface, the graphic may be rendered via calling the second graphic processing interface with the graphic rendering engine interface.

The dynamic transformation flow may be described hereinafter taking that the D3D interface and the GDI may be encapsulated in the graphic rendering engine.

The dynamic transformation may refer to that the graphic rendering engine has been successfully initialized as the D3D interface, a fatal rendering error (such as a video memory is insufficient) occurs in the process for running the graphic rendering engine, a transformation operation may be needed to continue to render the graphic using the GDI to prevent the collapse of the software.

As shown in FIG. 3, resource management, error management and a transformation bridge module may provide services for transforming from the D3D mode to the GDI mode, which may be described hereinafter.

A) Resource management: In a process that the D3D mode is dynamically transformed to the GDI mode, all the D3D resources may need to be transformed into the GDI resources. The resources may include the texture and surface of the D3D and status parameters for maintaining the texture and the surface. Therefore, these resources should be managed in advance. In various embodiments, these resources that may be changed may be maintained with a list.

Taking RenderTarget for example, there may be a global list:

list<RenderTarger>g_pRTList;

In a construction function of the RenderTarget, these resources that may be changed may be added to the list: g_pRTList.push_back(this).

In a destruction function, these resources that may be changed may be erased from the list: g_pRTList.erase(this).

Other resources which may need to be managed in the graphic rendering engine in various embodiments may include:

| Resource | Internal transformation |
| --- | --- |
| RenderDevice | D3DRenderDeviceInner -> GDIRenderDeviceInner |
| RenderTarget | D3DRenderer -> GDIRenderer D3DRenderTargetData -> GDIRenderTargetData |
| Image | D3DImageData -> GDIImageData |
| Font | Create a GDI object HFONT |
| Pen | Create a GDI object HPEN |
| Brush | Create a GDI object HBRUSH |

B) Error management: The graphic rendering engine in various embodiments may perform restrict error management on each D3D calling to ensure that the D3D mode may be transformed to the GDI mode when a fatal D3D error occurs. Each D3D calling may return a HRESULT to report whether the calling is successful. The fatal D3D error defined in the graphic rendering engine provided by various embodiments may include:

| HRESULT | Description |
| --- | --- |
| E_OUTOFMEMORY | Insufficient memory |
| D3DERR_OUTOFVIDEOMEMORY | Insufficient memory |
| D3DERR_INVALIDCALL | Parameter errors |

C) Transformation Bridge

When an exception occurs in the D3D rendering, the dynamic transformation flow may be dynamically performed.

The dynamic transformation process may include: changing initial status flags of all managed resources from the D3D to the GDI;

processing, by the transformation bridge, all the managed resource, which may be a group of encapsulated transformation functions and may be used for transforming the D3D resources into the GDI resources;

releasing all the D3D resources; and rendering graphics by calling the GDI with the graphic rendering engine interface.

The transformation operation of the transformation bridge may include:

| Source | Target | Transformation method |
| --- | --- | --- |
| IDirect3DTexture9 (RenderTarget) | HBITMAP | The texture data may be read from the video memory and written into the memory by calling the GetRenderTargetData. The GetDC is called and the texture data in the memory may be copied to the HBITMAP of the GDI with the BitBlt. |
| IDirect3DTexture9 (ManagedPool) | HBITMAP(32 bits) | Source Texture may be locked with Lock and the texture data may be copied to the HBITMAP using StretchDIBits. |

With the above method, by default, the graphic may be drawn with the D3D interface (the graphic rendering engine is in the D3D mode) if it may be permitted by system conditions and rendering environment may be normal. The video card may be sped up with the D3D mode, by which the highest rendering efficiency and lowest CPU occupation may be achieved.

If it may not be permitted by the system conditions (such as a display driver may not be installed) or an error (such as the video memory is insufficient) occurs in the D3D rendering process, the working mode of the graphic rendering engine may be seamlessly transformed into the GDI mode in the static mode or the dynamic mode. The graphics may be rendered with the GDI to satisfy the compatibility requirements.

With the method for implementing the graphic rendering engine provided by various embodiments, the following technical effects may be achieved.

Since the first graphic processing interface and the second graphic processing interface may be two different graphic processing interfaces, in various embodiments, the two different graphic processing interfaces with different advantages may be encapsulated together to form a graphic rendering engine interface. In the process for rendering an interface of an application, the graphic rendering engine interface may automatically select a graphic processing interface according to the system environment to implement the corresponding rendering function. The programmer may not need to pay attention to which graphic processing interface is called. Instead, the programmer may render graphics via calling the graphic rendering engine interface. The processing for encapsulating the two different graphic processing interfaces, i.e., the D3D interface and GDI and the process for transforming between the two different graphic processing interfaces in an actual graphic rendering process may be described in the above embodiments. The process for encapsulating the OpenGL interface and the GDI together and the transformation process are similar to that described above. The graphic rendering engine provided by various embodiments may have the advantages of the two graphic processing interfaces. The graphic rendering engine provided by various embodiments may have the comprehensive performances of high rendering efficiency, less CPU occupation and good compatibility and easy-to-use interfaces.

The graphic rendering engine provided by various embodiments may be described hereinafter.

Figure 7:
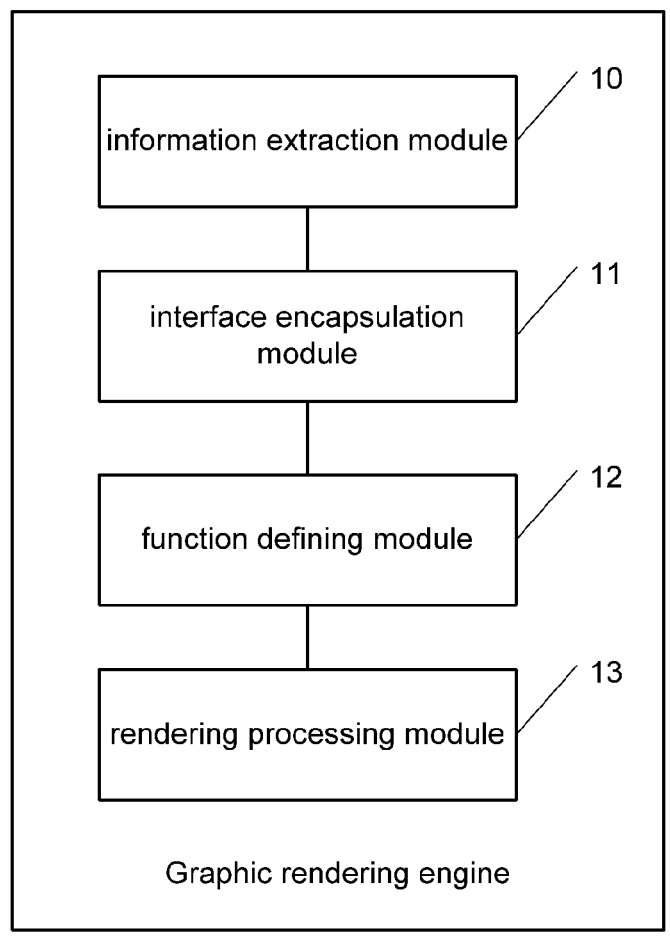
FIG. 7 is a schematic diagram illustrating a graphic rendering engine in accordance with various embodiments.

Referring to FIG. 7, FIG. 7 is a schematic diagram illustrating a graphic rendering engine in accordance with various embodiments.

The graphic rendering engine provided by various embodiments may include:

an information extraction module 10, to extract rendering function information of a first graphic processing interface and a second graphic processing interface;

an interface encapsulation module 11, to encapsulate the first graphic processing interface and the second graphic processing interface as a graphic rendering engine interface;

a function defining module 12, to define member functions of the graphic rendering engine interface according to the rendering function information extracted by the information extraction module 10; and a rendering processing module 13, to implement a rendering function corresponding to the member functions by calling the first graphic processing interface or the second graphic processing interface with the graphic rendering engine interface.

In practice, the rendering functions of the first graphic processing interface and the second graphic processing interface may be classified into following four categories.

The first category may include functions, such as initializing the rendering engine, controlling the rendering flow and managing a device status.

The second category may include functions, such as rendering various shapes, characters and graphics, selecting the resources and controlling a coordinate and a viewing angle.

The third category may be a computing and expression function of the coordinate.

The fourth category may represent various rendering resources, such as a brush, a pen, a font and an image.

In order to encapsulate the first graphic processing interface and the second graphic processing interface, the information extraction module 10 may need to extract the common rendering function information of the first graphic processing interface and the second graphic processing interface. The rendering function information of the above four categories may be extracted. The rendering function information of the first graphic processing interface and the second graphic processing interface may include but not be limited to that of the above four categories, which are listed for example.

After the rendering function information may be extracted, the interface encapsulation module 11 may encapsulate the first graphic processing interface and the second graphic processing interface as the graphic rendering engine interface. Then, the function defining module 12 may define the member functions of the graphic rendering engine interface according to the rendering function information.

In practice, the member functions of the graphic rendering engine interface may include: a RenderDevice function, a RenderTarget function, a Size and Coordinate function and a Resources function. Each function may be shown in FIG. 2, which is not repeated here.

Figure 8:
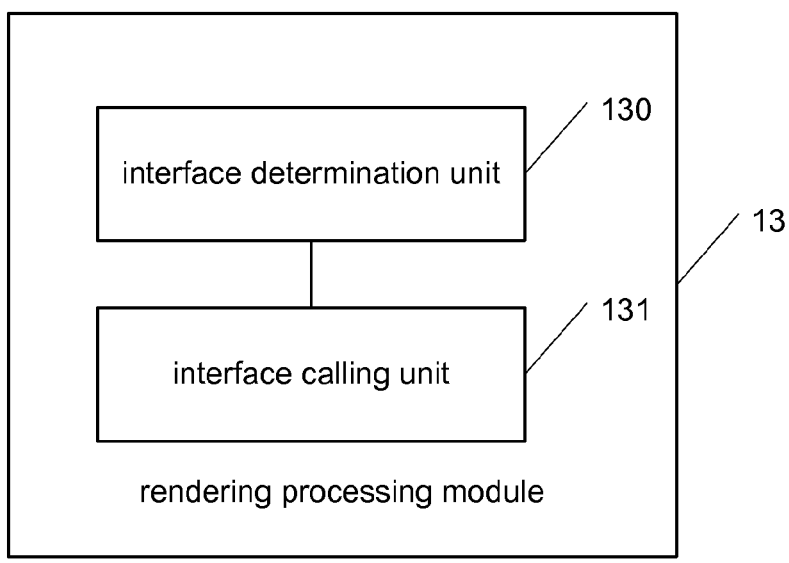
FIG. 8 is a schematic diagram illustrating a rendering processing module in a graphic rendering engine in accordance with various embodiments.

Referring to FIG. 8, FIG. 8 is a schematic diagram illustrating a rendering processing module in a graphic rendering engine in accordance with various embodiments.

This embodiment may describe implementing, by the rendering processing module 13, the rendering function corresponding to the member functions by calling the first graphic processing interface or the second graphic processing interface with the graphic rendering engine interface hereinafter in detail. The rendering processing module 13 may include:

an interface determination unit 130, to determine whether the first graphic processing interface may be normally used when the graphic rendering engine starts; and an interface calling unit 131, to implement the rendering function corresponding to the member functions by calling the first graphic processing interface with the graphic rendering engine interface if the first graphic processing interface may be normally used and render a graphic by calling the second graphic processing interface with the graphic rendering engine interface if the interface determination unit determines that the first graphic processing interface may not be normally used.

As described above, whether the first graphic processing interface may be normally used may be determined by the interface determination unit 130 of the rendering processing module 13 when the graphic rendering engine starts. When the first graphic processing interface may not be normally used, the graphic may be rendered via calling the second graphic processing interface by the interface calling unit 131. The above processing may refer to the static transformation between different graphic processing interfaces. The static transformation process may be described hereinafter taking that the D3D interface and the GDI are encapsulated in the graphic rendering engine for an example.

The static transformation may refer to that when a user instructs to initialize (i.e., InitAsD3DRenderDevice mentioned in the above "codes") the graphic rendering engine in the D3D mode, it may be detected that the current OS cannot support the D3D mode, or an error occurs in a step that the D3D is initialized, the current process may be transformed to a process, in which the graphic rendering engine may be initialized in the GDI mode. Since the transformation process may be performed when a program is initialized, the graphic rendering engine may not create any resource then. Therefore, the static transformation process may be simple.

Figure 9:
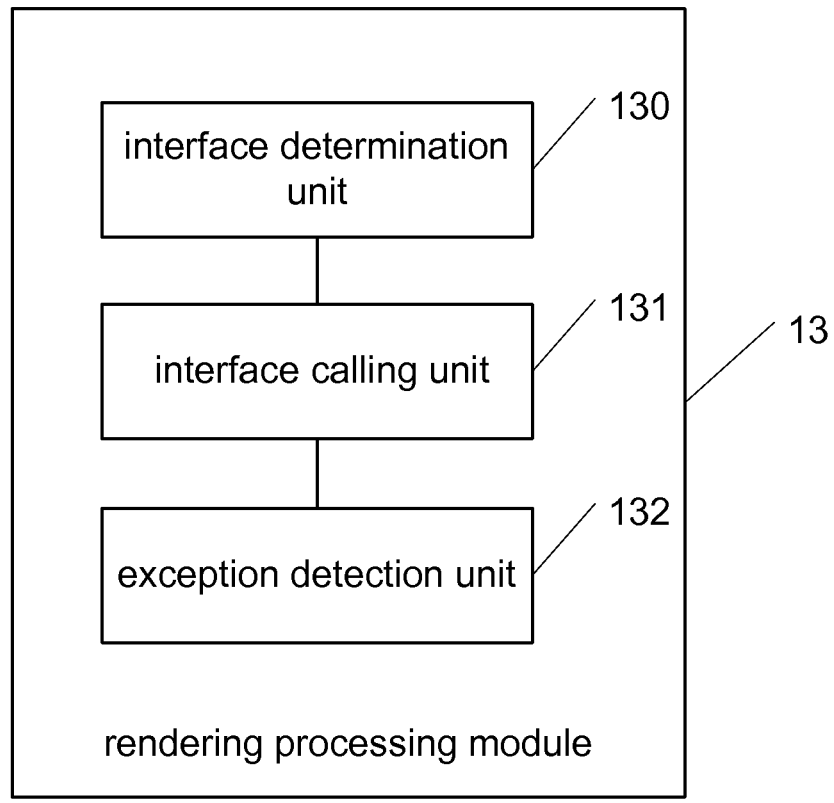
FIG. 9 is a schematic diagram illustrating another rendering processing module in a graphic rendering engine in accordance with various embodiments.

Referring to FIG. 9, FIG. 9 is a schematic diagram illustrating another rendering processing module in a graphic rendering engine in accordance with various embodiments.

This embodiment may describe implementing, by the rendering processing module 13, the rendering function corresponding to the member functions by calling the first graphic processing interface or the second graphic processing interface with the graphic rendering engine interface hereinafter in detail. The dynamic transformation process of the graphic processing interface may be implemented in this embodiment. Except for the interface determination unit 130 and the interface calling unit 131 in the embodiment shown in FIG. 8, the rendering processing module 13 may further include:

an exception detection unit 132, to detect whether an exception happens when the interface calling unit 131 calls the first graphic processing interface to implement the rendering function corresponding to the member functions and notify the interface calling unit 11 of a detection result.

The interface calling unit 131 may be further to render the graphic by calling the second graphic processing interface with the graphic rendering engine interface when the exception detection unit 132 detects the exception.

When the above graphic rendering engine starts, if the interface determination unit 130 may determine that the first graphic processing interface may be normally used, the interface calling unit 131 may implement the rendering function corresponding to the member functions by calling the first graphic processing interface first with the graphic rendering engine interface and render the graphic by calling the second graphic processing interface when the exception detection unit 132 may detect that the first graphic processing interface is abnormal. The above processing may be the dynamic transformation mode between different graphic processing interfaces. The specific dynamic transformation method may be described in the flow of the third embodiment of the graphic rendering engine provided by various embodiments, which is not repeated here.

Figure 10:
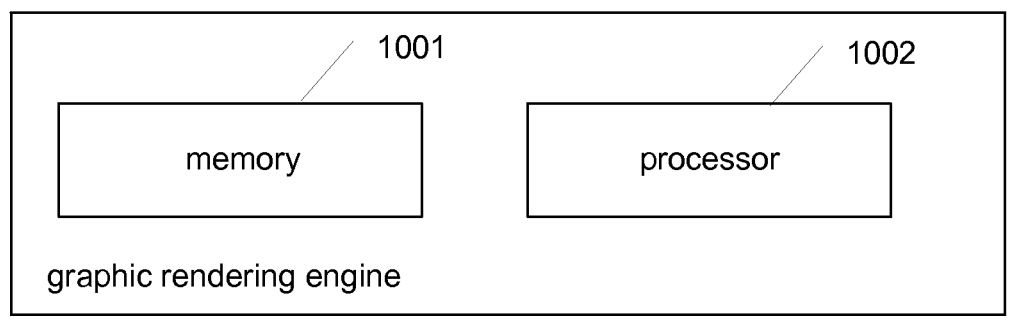
FIG. 10 is a schematic diagram illustrating another graphic rendering engine in accordance with various embodiments.

Referring to FIG. 10, FIG. 10 is a schematic diagram illustrating another graphic rendering engine in accordance with various embodiments.

The graphic rendering engine may include a memory 1001 and a processor 1002.

The memory 1001 may store instructions. The processor 1002 may communicate with the memory 1001 and execute the instructions in the memory 1001;

to extract rendering function information of a first graphic processing interface and a second graphic processing interface;

to encapsulate the first graphic processing interface and the second graphic processing interface as a graphic rendering engine interface;

to define member functions of the graphic rendering engine interface according to the rendering function information extracted by the information extraction module; and to implement a rendering function corresponding to the member functions by calling the first graphic processing interface or the second graphic processing interface with the graphic rendering engine interface.

The member functions of the graphic rendering engine interface may include a RenderDevice function, a RenderTarget function, a Size and Coordinate function and a Resources function.

The processor 1002 may further execute the instructions in the memory 1001 to determine whether the first graphic processing interface may be normally used when the graphic rendering engine starts and implement the rendering function corresponding to the member functions by calling the first graphic processing interface with the graphic rendering engine interface if the first graphic processing interface may be normally used and render a graphic by calling the second graphic processing interface with the graphic rendering engine interface if the interface determination unit determines that the first graphic processing interface may not be normally used.

The processor 1002 may further execute the instructions in the memory 1001 to detect whether an exception happens when the interface calling unit calls the first graphic processing interface to implement the rendering function corresponding to the member functions and notify the interface calling unit of a detection result and render the graphic by calling the second graphic processing interface with the graphic rendering engine interface when the exception detection unit detects the exception.

The first graphic processing interface may be a Direct3D (D3D) interface or an Open Graphics Library (OpenGL) interface and the second graphic processing interface may be a Graphics Device Interface (GDI).

The graphic rendering engine provided by various embodiments may include the following advantages.

Since the first graphic processing interface and the second graphic processing interface may be two different graphic processing interfaces, in various embodiments, the two different graphic processing interfaces with different advantages may be encapsulated together to form a graphic rendering engine interface. In the process for rendering an interface of an application, the graphic rendering engine interface may automatically select a graphic processing interface according to the system environment to implement the corresponding rendering function. The programmer may not need to pay attention to which graphic processing interface is called. Instead, the programmer may render graphics via calling the graphic rendering engine interface. The processing for encapsulating the two different graphic processing interfaces, i.e., the D3D interface and GDI and the process for transforming between the two different graphic processing interfaces in an actual graphic rendering process may be described in the above embodiments. The process for encapsulating the OpenGL interface and the GDI together and the transformation process are similar to that described above. The graphic rendering engine provided by various embodiments may have advantages of the two graphic processing interfaces. The graphic rendering engine provided by various embodiments may have the comprehensive performances of high rendering efficiency, less CPU occupation and good compatibility and easy-to-use interfaces.

With the above description of the above embodiments, one with ordinary skill in the art of the present disclosure would recognize that various embodiments may be implemented with software and necessary hardware or may be implemented with hardware. All or partial of the technical schemes in examples of the various embodiments that contribute to the background may be implemented by computer software products. The computer software products may be stored in a storage medium, such as a ROM/RAM, a disk, or a CD. The storage medium may include instructions, which may be executed by a computer (such as a Personal Computer (PC), a server, or a network device) to execute each of the above various embodiments or execute the methods described in partial of the embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for implementing a graphic rendering engine, comprising:
    extracting rendering function information of a first graphic processing interface and a second graphic processing interface;
    encapsulating the first graphic processing interface and the second graphic processing interface as a graphic rendering engine interface;
    defining member functions of the graphic rendering engine interface according to the rendering function information;
    implementing a rendering function corresponding to the member functions by calling the first graphic processing interface or the second graphic processing interface with the graphic rendering engine interface;
    determining whether the first graphic processing interface is abnormal when implementing the rendering function corresponding to the member functions using the first graphic processing interface; and
    rendering a graphic by calling the second graphic processing interface with the graphic rendering engine interface if the first graphic processing interface used to implement the rendering function corresponding to the member functions is abnormal.

2. The method according to claim 1, wherein the member functions of the graphic rendering engine interface comprise: a RenderDevice function, a RenderTarget function, a Size and Coordinate function and a Resources function.

3. The method according to claim 2, wherein implementing the rendering function corresponding to the member functions by calling the first graphic processing interface or the second graphic processing interface with the graphic rendering engine interface comprises:
    determining whether the first graphic processing interface may be normally used when the graphic rendering engine starts;
    implementing the rendering function corresponding to the member functions by calling the first graphic processing interface with the graphic rendering engine interface if the first graphic processing interface may be normally used;
    rendering a graphic by calling the second graphic processing interface with the graphic rendering engine interface if the first graphic processing interface may not be normally used.

4. The method according to claim 3, wherein determining whether the first graphic processing interface may be normally used comprises:
    checking whether an Operation System (OS) supports the first processing interface, determining that the first graphic processing interface may be normally used if the OS supports the first graphic processing interface and determining that the first graphic processing interface may not be normally used if the OS does not support the first graphic processing interface; or determining whether an error occurs when the first graphic processing interface is initialized if the OS supports the first graphic processing interface, determining that the first graphic processing interface may not be normally used if an error occurs when the first graphic processing interface is initialized and determining that the first graphic processing interface may be normally used if no error occurs when the first graphic processing interface is initialized.

5. The method according to claim 1, wherein the first graphic processing interface is a Direct3D (D3D) interface or an Open Graphics Library (OpenGL) interface; and
the second graphic processing interface is a Graphics Device Interface (GDI).

6. A graphic rendering engine, comprising:
an information extraction module, to extract rendering function information of a first graphic processing interface and a second graphic processing interface;
an interface encapsulation module, to encapsulate the first graphic processing interface and the second graphic processing interface as a graphic rendering engine interface;
a function defining module, to define member functions of the graphic rendering engine interface according to the rendering function information extracted by the information extraction module; and
a rendering processing module to implement a rendering function corresponding to the member functions by calling the first graphic processing interface or the second graphic processing interface with the graphic rendering engine interface;
wherein the rendering processing module further comprises:
an exception detection unit, to detect whether the first graphic processing interface is abnormal when the rendering function corresponding to the member functions is implemented using the first graphic processing interface and notify an interface calling unit of a detection result; and
wherein the interface calling unit is further to render the graphic by calling the second graphic processing interface with the graphic rendering engine interface when the exception detection unit detects that the first graphic processing interface used to implement the rendering function corresponding to the member functions is abnormal.

7. The graphic rendering engine according to claim 6, wherein the member functions of the graphic rendering engine interface comprise: a RenderDevice function, a RenderTarget function, a Size and Coordinate function and a Resources function.

8. The graphic rendering engine according to claim 7, wherein the rendering processing module comprises:
an interface determination unit, to determine whether the first graphic processing interface may be normally used when the graphic rendering engine starts;
an interface calling unit, to implement the rendering function corresponding to the member functions by calling the first graphic processing interface with the graphic rendering engine interface if the first graphic processing interface may be normally used and render a graphic by calling the second graphic processing interface with the graphic rendering engine interface if the interface determination unit determines that the first graphic processing interface may not be normally used.

9. The graphic rendering engine according to claim 6, wherein the first graphic processing interface is a Direct3D (D3D) interface or an Open Graphics Library (OpenGL) interface; and
the second graphic processing interface is a Graphics Device Interface (GDI).

* * * * *